United States Patent
Göpel

[11] Patent Number: 5,243,940
[45] Date of Patent: Sep. 14, 1993

[54] SELF-IGNITING RECIPROCATING INTERNAL COMBUSTION ENGINE

[76] Inventor: Theo Göpel, Frauenstädtstr. 13, Munich, Fed. Rep. of Germany

[21] Appl. No.: 932,165

[22] Filed: Aug. 19, 1992

[30] Foreign Application Priority Data

Oct. 24, 1991 [DE] Fed. Rep. of Germany ....... 4135135

[51] Int. Cl.⁵ .............................................. F02B 3/00
[52] U.S. Cl. ..................................................... 123/299
[58] Field of Search ................. 123/299, 275, 431, 432

[56] References Cited

U.S. PATENT DOCUMENTS

| | | | |
|---|---|---|---|
| 4,217,871 | 8/1980 | Ohashi et al. | 123/299 |
| 4,368,702 | 1/1983 | Finsterwalder et al. | 123/299 |
| 5,050,550 | 9/1991 | Gao | 123/431 |

Primary Examiner—Raymond A. Nelli
Attorney, Agent, or Firm—Lowe, Price, LeBlanc & Becker

[57] ABSTRACT

A self-igniting reciprocating internal combustion engine 10 comprises at least one cylinder 11, whith has a main combustion chamber 19, at least one ignition chamber 20, which is associated with each cylinder 11 and has a volume which is smaller than the volume of that main combustion chamber and which communicates with said main combustion chamber 19 through a flash passage 21, and a controlled-capacity fuel injection pump 17 for injecting fuel through a fuel injector 16 into the main combustion chamber 19. In reciprocating internal combustion engines having two fuel injectors for each cylinder, one ignition prechamber associated with each cylinder 11 is provided with a separate fuel injector for injecting fuel supplied by a fixed-capacity fuel injection pump 23. In reciprocating internal combustion engines having only one fuel injector for each cylinder, one injection chamber 20 associated with each cylinder 11 is provided with a glow-ignition means, which consists of, e.g. of a heater coil that is continuously electrically energizable, and/or an igniting pin, which is made of temperature-resistant and heat-storing material, projecting into the middle region of the ignition prechamber.

16 Claims, 5 Drawing Sheets

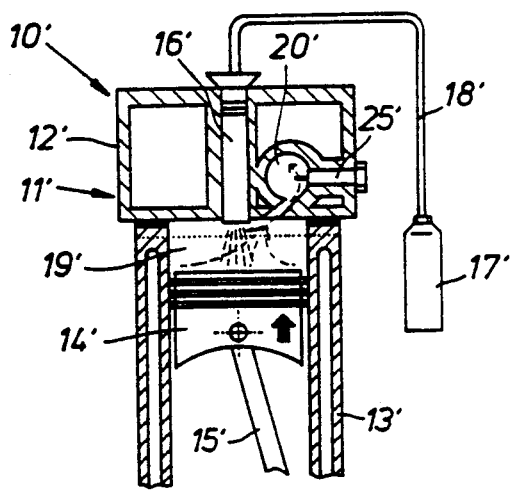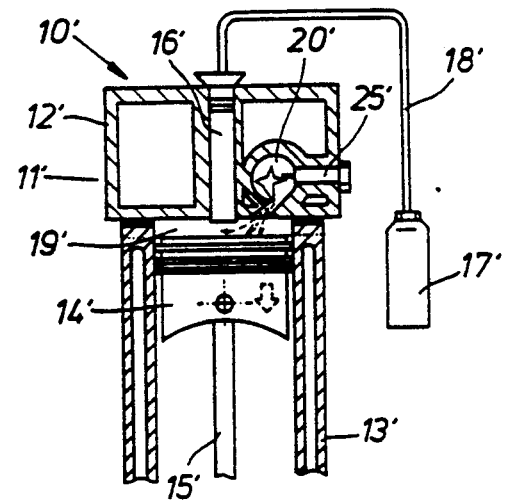

SELF-IGNITING RECIPROCATING INTERNAL COMBUSTION ENGINE

BACKGROUND OF THE INVENTION

1. Field of the Invention

This invention relates to a self-igniting reciprocating internal combustion engine for direct fuel injection and for use as a two-stroke-cycle or four-stroke-cycle engine. 2. Description of the Prior Art In internal combustion engines it is known to subdivide the combustion chamber in order to improve the quality of the mixture being formed during the compression stroke by a high turbulence. A distinction can be made between the so-called prechamber process, the swirl chamber process, the air chamber process and the direct fuel injection process.

In the prechamber process, a prechamber is provided, which has a volume of about 20% of the compression volume because fuel is injected only into the prechamber. The deficiently of air in said chamber at the beginning of the ignition or combustion has the undesirable results that carbon black is formed, that the fuel is not completely utilized and, in particular, that an afterburning takes place during the expansion stroke. A further disadvantage resides in the losses, which are mainly caused by hydraulic heat transfer that is due to the division of the combustion chamber and which involve a fairly high fuel consumption.

In the swirl chamber process a swirl chamber is used, which has a volume of up to 50% of the compression volume. Fuel is injected only into the swirl chamber and the combustion pressure is initially generated in the swirl chamber and is then transferred to the main compression spaces through the flash passage, through which the swirl chamber communicates with the main compression chamber, in which the pressure is applied to the piston. Afterburning may occur in that case too and the division of the combustion chamber undesirably results in high losses owing to the heat transfer and, in a fairly high specific fuel consumption.

In the air chamber process there is no injection of fuel into the air chamber but fuel is injected in or opposite to the overflow direction in a funnel-shaped flash passage. Just as in the prechamber process and the swirl chamber process, the mixture is formed in the main combustion chamber also by the burning gas stream. A disadvantage of the air chamber process resides in the somewhat rough operation of the engine and in the high fuel consumption.

In the direct fuel injection process the mixture is formed by the injection of fuel and is less desirable than in the above-mentioned processes because there is no turbulence or only a low turbulence. Besides, the air demand is high and results in a poor utilization of the air and the mean effective is not as high as in prechamber and swirl chamber engines. Another disadvantage resides in the sudden ignition and combustion of the mixture and the resulting rough operation of the engine. Besides, the high fuel injection pressures used in the fuel injection process require powerful fuel pumps.

Each of the processes mentioned hereinbefore has specific disadvantages and represents a comprise because one source of losses or another is intentionally tolerated in the desire to minimize the total losses. It has not been possible thus far to minimize all losses and, at the same time, to meet present-day requirements as regards environmental compatibility, improved efficiency, and a simple structure of the engine unit. These remarks are also applicable to the high compression ratio, which was previously required and which is inconsistent with the requirements for a satisfactory and economical operation, which would require low compression ratios. The high compression ratio previously employed calls for high strengths, which can be achieved only in heavy engines. On the other hand, the use of lower compression ratios would permit engines to be built which are lighter in weight.

Published German Patent Application 15 26 290 discloses an externally ignited engine having a relatively low compression ratio and comprising a main combustion chamber, an ignition chamber and a flash passage. The volume of the ignition chamber is about 7.5% of the volume of the main combustion chamber. The ignition chamber contains a spark plug or heater. Fuel is injected through a multi-jet fuel injector, by which a first fuel jet is directly injected through the flash passage into the ignition chamber and a second fuel jet is injected against the surface of recess in the piston. In connection with external ignition by means of the spark plug which is provided, it has been stated only broadly that fuel may be injected into the ignition chamber before the main quantity of fuel is injected into the main combustion chamber. A disadvantage of that concept resides in the complicated design and control of the fuel injector. Besides, the fuel must be injected under a high pressure so that an engine which would be light in weight cannot be designed.

Published German Patent Application 29 22 683 discloses an air-compressing self-igniting internal combustion engine, which is operated by the swirl chamber process and comprises a fuel injector for injection fuel into the swirl chamber and a separate fuel injector for injecting fuel into the main combustion chamber. The two fuel injectors are supplied with fuel from a single fuel injection pump through a control valve, by which the supply of fuel to the second fuel injector is controlled in dependence on load or speed. In that case a disadvantage of that system resides in that it is highly susceptible to trouble and that a powerful fuel injection pump is required.

Published German 40 33 843 discloses a two-component internal combustion engine, wherein natural gas or other gaseous fuels are to be ignited by a small pilot quantity. This is effected by introducing a small pilot quantity of Diesel gas or another inflamable fuel in a self-igniting chamber. Burning gas or natural gas is sucked in through an inlet valve into the cylinder and is then compressed therein. There is no usual Diesel injection. Though there is an injecting nozzle in the middle of the cylinder head this is not for working, but only for starting, since, after start, operation is switched over to natural gas operation. Moreover, with this igniting internal combustion engine there is no preheating in an igniting chamber and, therefore, there is a high compression and, necessarily, a massive design of cylinder head, which simultaneously results in an increase of the weight of the internal combustion engine which is not advantageous. Finally, there is only one injecting pump, which is provided only for the starting phase.

SUMMARY OF THE INVENTION

It is an object of the invention to provide an engine which is of the kind described first hereinbefore and has a higher economy in operation.

Specifically, it is desired to provide self-igniting reciprocating internal combustion engine which may have a large displacement volume, from a diesel engine for ships or the like engines to a diesel engine having a small displacement volume, such as small diesel engines, in which the displacement volume may be as small as about 100 cm$^3$ and which may be used to drive emergency power-generating units, water pumps in developing countries, and the like.

Said objects are accomplished in accordance with the invention by the provision of a self-igniting reciprocating internal combustion engine, which comprises at least one cylinder having a main combustion chamber, at least one ignition prechamber, which is associated with each cylinder and has a smaller volume than the combustion chamber of said cylinder and communicates with said main combustion chamber through a flash passage, and a controlled-capacity fuel injection pump for injecting fuel through a fuel injector into the main combustion chamber.

Further improvements of the invention will be achieved by preferred additional features, which are defined in the dependent claims.

The self-igniting reciprocating internal combustion engine in accordance with the invention is superior to previously known diesel engines for direct fuel injection because a lower compression ratio, a lower combustion pressure, a more favorable utilization of the air, a lighter weight of the engine, a lower fuel injection pressure, a simpler fuel injector and a simpler fuel injection pump may be achieved. Another advantage resides in that a difficultly ignitable fuel, such as rapeseed oil or the like, can be injected into the main combustion chamber, and fuels of lower grade (heavy fuels) can be used in large diesel engines. In comparison with diesel engines for the prechamber, swirl chamber and air chamber processes the self-igniting reciprocating internal combustion engine in accordance with the invention distinguishes mainly in that the fuel consumption is low and carbon black is not formed or hardly formed.

An advantage of the self-igniting reciprocating internal combustion engine in accordance with the invention resides in that the quality of the mixture being formed is superior to the mixture formed in all previously known diesel engines. The burn-through times are desirably short because oxygen in the quantity required for a complete combustion is immediately available as the fuel is injected into the main combustion chamber, also in engines in which the fuel is separately injected into the swept volume of the cylinder and into the ignition prechamber.

The fuel injection pressure which is required is lower than in previously known diesel engines so that fuel injection pumps may be used which are simple and are reliable in operation.

Because a low compression ratio may be employed, the combustion pressure is desirably low and the reciprocating internal combustion engine may be lighter in weight.

Besides, a knocking caused by pressure peaks in the main combustion chamber before the top dead center will be minimized in the operation of the self-igniting reciprocating internal combustion engine in accordance with the invention because pressure peaks occurring before the top dead center can be dissipated into the at least one ignition prechamber which is provided.

Owing to the design of the self-igniting reciprocating internal combustion engine, air will flow from the cylinder chamber and the main combustion chamber through at least one flash passage into the associated ignition prechamber throughout the compression stroke and the overflowing air will give rise in the main combustion chamber and in the ignition prechamber or chambers to a turbulence, which will promote the formation of the mixture. A controlled quantity of fuel is centrally injected into the main combustion chamber before and until the top dead center and air which flows over from the main combustion chamber into the ignition chamber causes part of the injected fuel to be entrained into the ignition prechamber or chambers. The temperature in each ignition prechamber is adjusted to a value which is higher by about 150° to 200° C. than the temperature in the main combustion chamber. That adjustment is effected in that the ignition prechamber is not cooled by fresh air and that the engine cooling is correspondingly reduced adjacent to the ignition prechamber. That high temperature difference causes the ignition always to begin in the ignition prechamber or chambers.

In self-igniting reciprocating internal combustion engines in which two separate fuel injectors are provided for each cylinder, fuel is injected into an ignition prechamber associated with each cylinder shortly before the top dead center, the ignition to initiate the combustion is effected in that ignition prechamber and an igniting jet flashes from that igniting chamber into the main combustion chamber, in which that jet impinges on an ignitable mixture, which has been well conditioned by a high turbulence. Even if the ignition in the main combustion chamber should begin shortly before the top dead center, the ignition will cause the pressure to rise to a peak initially in the ignition prechamber or chambers, so that the pressure in said chamber or chambers will rise. As a result, a Diesel knock, such as occurs in the case of direct fuel injection, will distinctly be reduced.

A simple fixed-capacity fuel injection pump is desirably employed and in accordance with a preferred feature of the invention is arranged to inject fuel directly into the injection chamber shortly before the top dead center in a quantity which is sufficient for the ignition. Fuel is preferably centrally injected into the main combustion chamber and in a direction which may be selected as required. According to a further feature of the invention the arrangement may be such that the controlled-capacity fuel injection pump is provided for the injection of difficultly ignitable fuel and the fixed-capacity fuel injection pump is provided for injecting readily ignitable fuel.

The heater is provided only for self-igniting reciprocating internal combustion engine comprising a single fuel injector for each cylinder and preferably comprises a heater coil, which is continuously electrically energizable. Besides, igniting paper may be preferably used as a starting aid, particularly if a small generator is used to continuously energize the heater coil and said generator can be operated only by the operation of the self-igniting reciprocating internal combustion engine.

BRIEF DESCRIPTION OF THE DRAWING

FIG. 5 is a schematic view which is similar to FIG. 4 and illustrates the processes taking place during the compression stroke.

FIG. 6 is a view which is similar to FIG. 5 and illustrates the processes taking place during the expansion stroke.

DETAILED DESCRIPTION OF THE PREFERRED EMBODIMENTS

Figure 1:
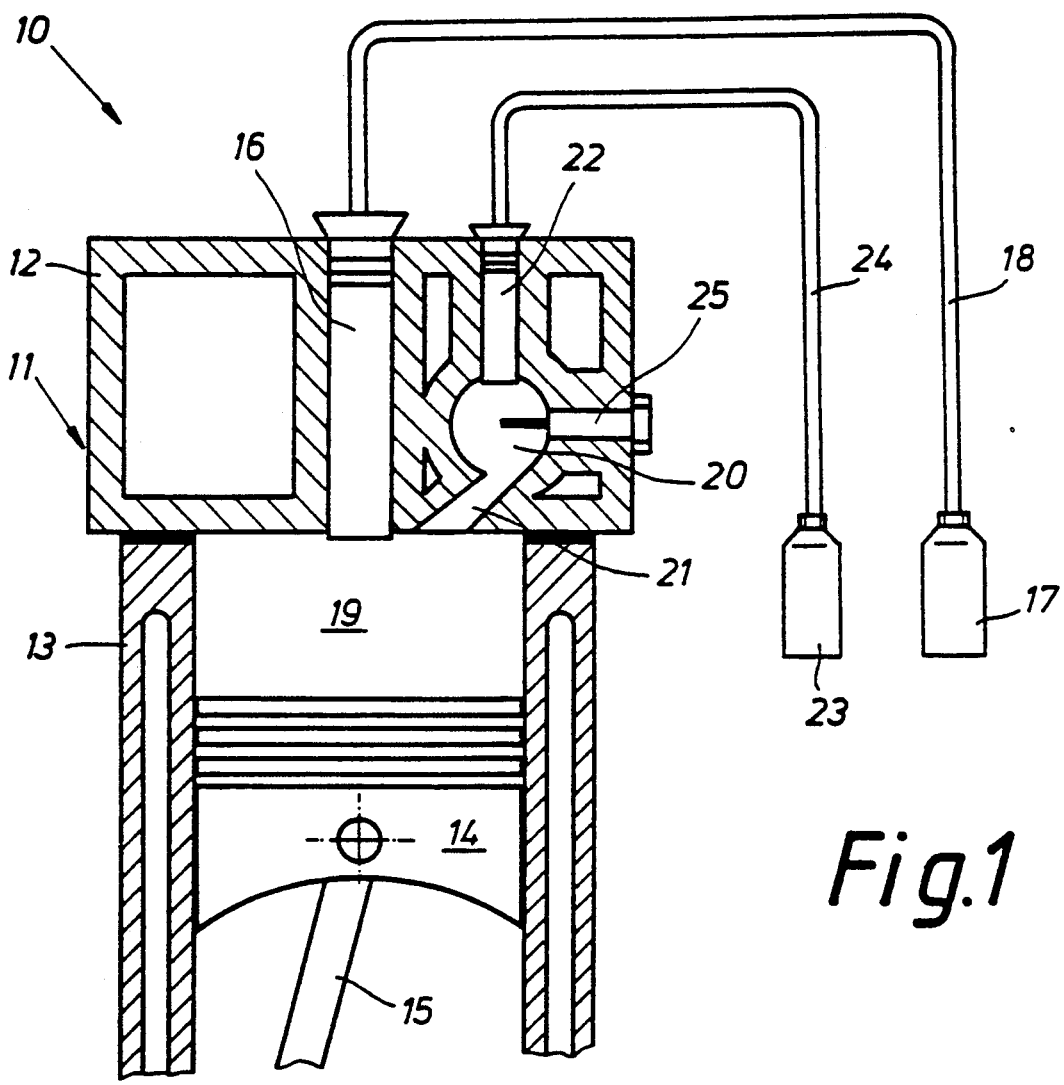
FIG. 1 is a schematic representation of an illustrative embodiment of a cylinder of a self-igniting reciprocating internal combustion engine.

Further details, features and advantages of the invention will become apparent form the following detailed description of the invention with reference to the drawing.

FIG. 1 is a schematic representation of an internal combustion engine 10, which comprises one cylinder 11 having a cylinder head 12, which in known manner is detachably secured and sealed to a cylinder block 13. Only the top portion of the cylinder block 13 is shown together with a piston 14 and a pivotally connected connecting rod 15. The cylinder block and the cylinder head are formed with cooling passages in known manner.

Adjacent to the center line of the piston 14 a fuel injector 16 is secured in the cylinder head 12. A fuel injection pump 17 serves to supply controlled quantities of fuel through a fuel line 18 to the fuel injector 16, by which fuel is centrally injected into the main combustion chamber 19 from above.

A spherical or cylindrical injection chamber 20 is formed in the cylinder head 12 laterally beside the fuel injector 16 and communicates with the main combustion chamber 19 through a flash passage 21, which flares toward the main combustion chamber 10. The ignition chamber 20 communicates with a fuel injector 22, which is mounted in the cylinder head 12 and is parallel to the fuel injector 16 and which is supplied through a fuel line 24 with fuel from a fixed-capacity fuel injection pump 29. Only if the engine has a small displacement volume does the ignition prechamber 20 also contain a heater coil 25, which is continuously electrically energizable and for that purpose is connected by means not shown to an electric power supply, such as a generator or battery.

Relatively or additionally, igniting paper can be provided as starting aid with low temperatures. Moreover, also said igniting paper or said electric glow-ignition means can be provided with an igniting pin made of temperature-resistant and heat-storing material, e.g. in form of a ceramic body encapsuled by a 2 to 3 mm casing, which projects up to the middle region of said igniting chamber and works as a heat-store for performing a starting aid function.

For the sake of simplicity the mechanical drives for the fuel injection pumps 17 and 23 have been omitted as well as means for timing the operation of the fuel injection pumps 17 and 23 and for controlling the capacity of the fuel injection pump 17.

The mode of operation of the internal combustion engine in accordance with the invention will now be described in more detail with reference to FIGS. 2 and 3.

Figure 2:
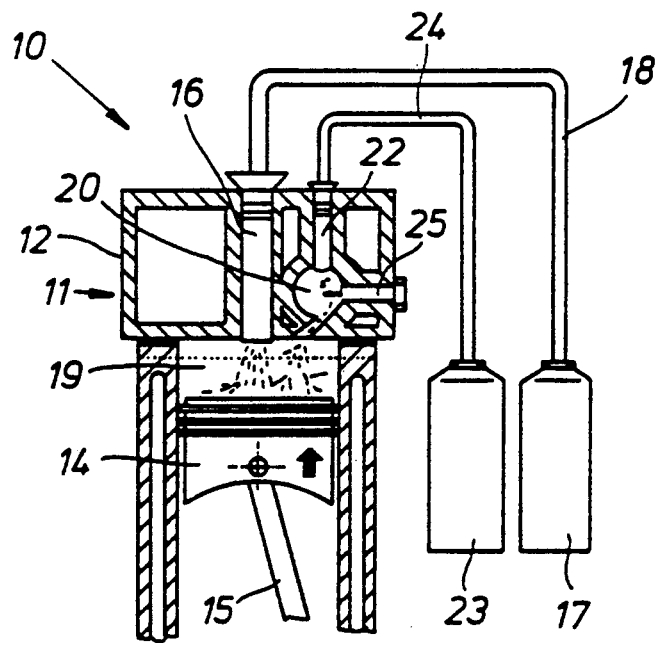
FIG. 2 is a schematic view which is similar to FIG. 1 and illustrates the processes taking place during the compression stroke.

According to FIG. 2 a piston 14 indicated by a black arrow moves during its compression stroke from its bottom dead center BDC to its top dead center TDC. Throughout the compression stroke, air is flowing from the swept volume and main combustion chamber 19 through the flash passage 21 into the ignition prechamber 20. The flow of air into the ignition prechamber 20 gives rise in the main combustion chamber 19 and in the ignition chamber 20 to an extremely high turbulence, by which the formation of the mixture is excellently promoted.

Before the top dead center is reached, the fuel injector 16 injects fuel into the main combustion chamber 19 at a central location until the top dead center and the quantity of that fuel is controlled in dependence on the speed of and the load on the engine. The air flowing from the main combustion chamber into the ignition chamber 20 antrains a part of the injected fuel into the ignition prechamber 20 and gives rise to a backflow turbulence in that chamber. The temperature in the ignition chamber 20 exceeds the temperature in the main combustion chamber 19 by about 150° to 200° C. This is due to the fact that the ignition prechamber 20 is not cooled by fresh air and that the engine cooling is correspondingly reduced adjacent to the ignition chamber.

Before the top dead center is reached, fuel is injected through the injector 22 and, as a result, an igniting jet flashes through the flash passage 21 into the main combustion chamber 19 at and after the top dead center. For this reason the combustion in the main combustion chamber will immediately be initiated at the top dead center and afterburning will be avoided. It is important for the function that the higher temperature in the ignition prechamber 20 intentionally causes the ignition to be initiated in said chamber and that the mixture that is ignited in the ignition prechamber will readily be ignitable owing to the high turbulence in the ignition prechamber. Besides, the igniting jet which flashes from the ignition prechamber 20 through the flash passage 21 into the main combustion chamber 19 will enter an extremely good mixture which has been formed in the main combustion chamber.

In the self-igniting reciprocating internal combustion engine 10 in accordance with the invention the ignitions in the ignition prechamber 20 and in the main combustion chamber 19 are delayed different times so that the ignitions in the ignition prechamber 20 and the main combustion chamber 19 occur at different times.

Figure 3:
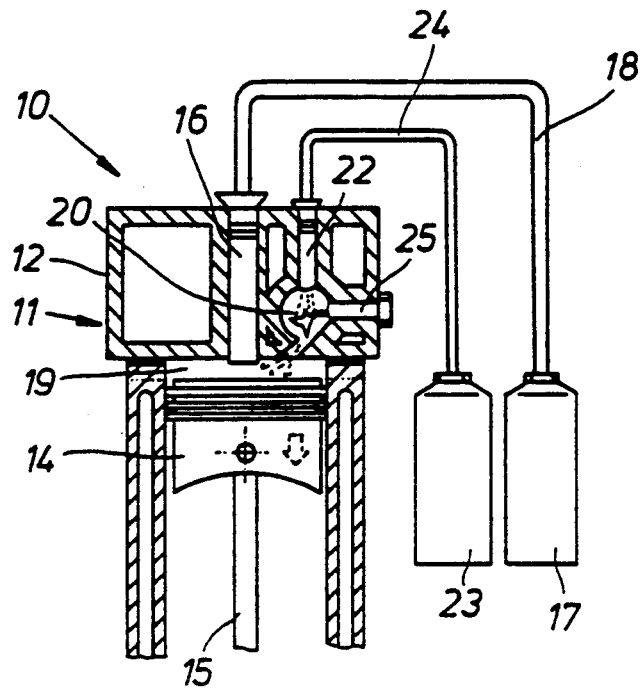
FIG. 3 is a view which is similar to FIG. 2 and illustrates the processes taking place during the expansion stroke.

Whereas a heater 25 is shown in FIGS. 1 to 3 it should be made clear that in engines comprising two separate injectors for each cylinder a heater may be used only as a starting aid consisting of a heater coil or of igniting paper for use when electric power is not available. Engines having only a single fuel injector for each cylinder will always be provided with a corresponding heater.

Owing to its proposed design the self-igniting internal combustion engine in accordance with the invention also permits a supply of different fuels by the two fuel injection pumps. For instance, a readily ignitable diesel fuel may be supplied to the ignition prechamber 20 whereas the main combustion chamber 19 may be supplied with a difficultly ignitable fuel, which is less expensive and more friendly to the environment, such as rapeseed oil or the like.

Whereas in the embodiment shown in FIGS. 1 to 3 the cylinder head 12 is provided with an ignition prechamber 20 and a flash passage 21, each cylinder may be provided with at least one additional ignition prechamber and an associated flash passage and in that case only one ignition prechamber of each cylinder will be provided with a fuel injector for injecting fuel supplied by a fixed-capacity fuel injection pump, which is common to all cylinders, and ignition prechamber volume will amount to about 15 to 40% of the displacement volume.

Figure 4:
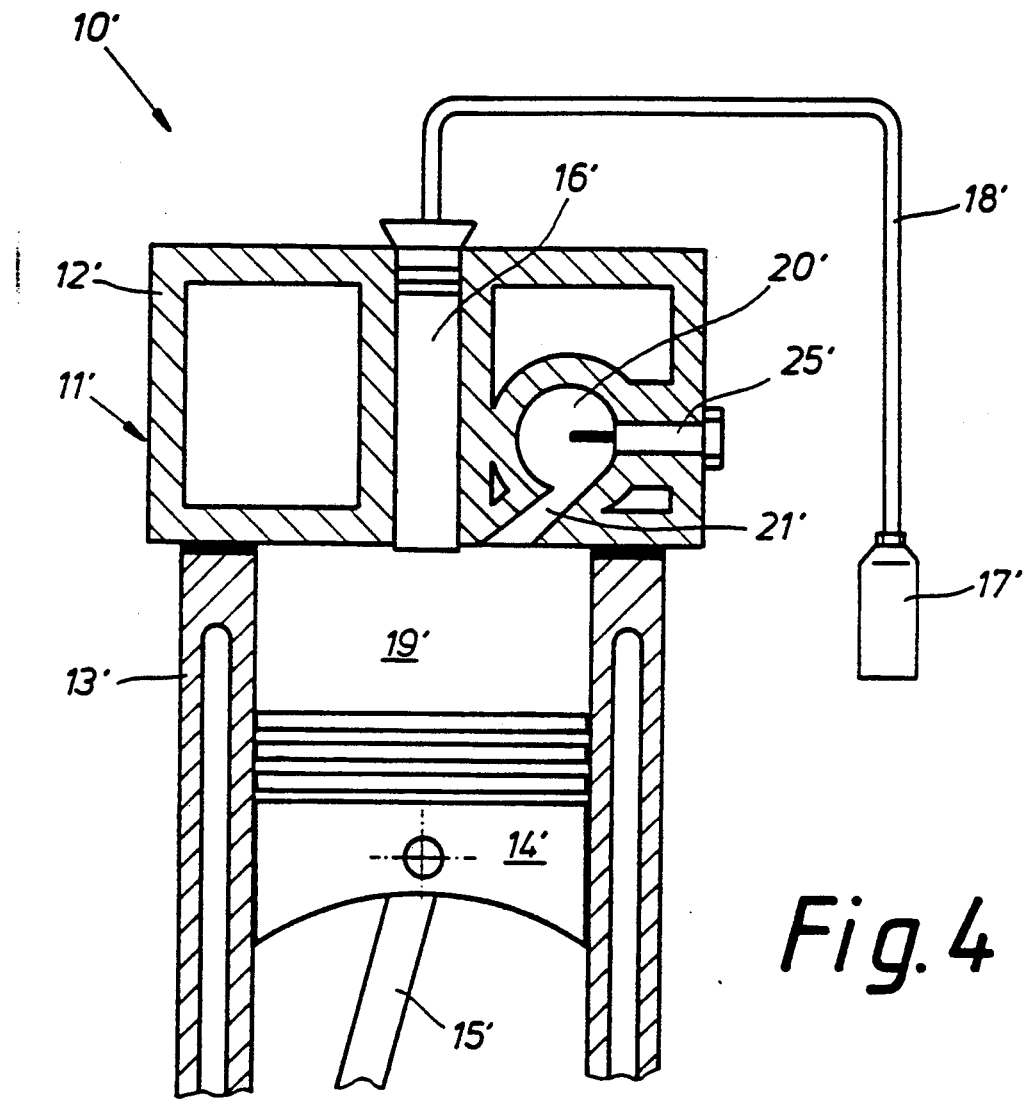
FIG. 4 is a schematic representation of another illustrative embodiment of a cylinder of a self-igniting reciprocating internal combustion engine.

A further illustrative embodiment of a self-igniting reciprocating internal combustion engine in accordance with the invention is shown in FIGS. 4 to 6. Reference characters of components which are similarly provided in the illustrative embodiment shown in FIGS. 1 to 3 have been provided with a prime (') for distinction.

The illustrative embodiment shown in FIGS. 4 to 6 is particularly intended for use as a self-igniting reciprocating internal combustion engine in which each cylinder has only a small displacement volume and/or is provided with only one fuel injector. A difference from the first embodiment described first hereinbefore resides in that the ignition prechamber 20' is not provided with a separate fuel injector that is supplied with fuel by a fixed-capacity fuel injection pump. The ignition prechamber 20' is always provided with a heater consisting of a heater coil which is continuously electrically energizable and with a starting aid consisting of an igniting paper, not shown. Reference to the description given hereinbefore is made as regards the mode of operation of that self-igniting reciprocating internal combustion engine.

Figure 7:
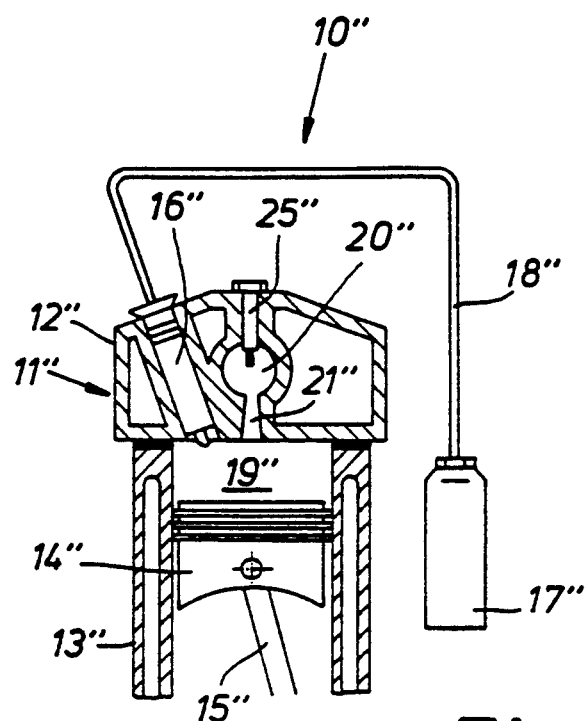
FIG. 7 is a schematic representation showing a further illustrative embodiment of a cylinder of a self-igniting reciprocating internal combustion engine comprising a centrally disposed combustion chamber.

FIG. 7 shows a further illustrative embodiment of a self-igniting reciprocating internal combustion engine 10" in accordance with the invention. That engine is particularly intended for cylinders provided with only one fuel injector each and having a displacement volume of an order of 100 cm$^3$. The reference characters of components which are similar to components shown also in FIGS. 4 and 6 have been provided with a double prime (") in FIG. 7. A difference from the second illustrative embodiment resides in that the ignition prechamber 20" is centrally disposed above the piston 14" and the fuel injector 16" is inclined and directed toward the central portion of the piston. That engine has also the mode of operation described hereinbefore for the first embodiment.

I claim:

1. A self-igniting reciprocating internal combustion engine, comprising
   at least one cylinder having a main combustion chamber,
   at least one smaller ignition prechamber external to said main combustion chamber for each cylinder, wherein each ignition prechamber is connected to the main combustion chamber through a flash passage,
   a variable-capacity fuel injection pump for injecting fuel through a fuel injector into the main combustion chamber, and
   a fixed-capacity fuel injection pump for each ignition prechamber per cylinder for injecting fuel separately into the ignition prechamber.

2. A self-igniting reciprocating internal combustion engine according to claim 1, further comprising
   a glow-ignition means for each ignition prechamber per cylinder.

3. An engine according to claim 1, wherein said fixed-capacity fuel injection pump directly injects fuel in a quantity sufficient for achieving ignition in said ignition prechamber through a fuel injector.

4. An engine according to claim 1, wherein a centrally disposd fuel injector is provided for injecting fuel into the main combustion chamber.

5. An engine according to claim 2, wherein a centrally disposd fuel injector is provided for injecting fuel into the main combustion chamber.

6. An engine according to claim 1, wherein said variable-capacity fuel injection pump injects difficult to ignite fuel and the fixed-capacity fuel injection pump injects readily ignitable fuel.

7. An engine according claim 1, wherein a glow-ignition means in a form of a heater coil, which is continuously electrically energizable, is provided for the ignition prechamber.

8. An engine according to claim 2, wherein a glow-ignition means in a form of a heater coil, which is continuously electrically energizable, is provided for the ignition prechamber.

9. A self-igniting reciprocating internal combustion engine according to claim 1, further comprising
   an igniting pin, which is made of temperature-resistant and heat-storing material and which projects into a middle region of the ignition prechamber, is provided as a starting aid for the ignition prechamber.

10. A self-igniting reciprocating internal combustion engine according to claim 2, further comprising
    a glow-ignition means for each ignition prechamber per cylinder,
    wherein an igniting pin, which is made of temperature-resistant and heat-storing material and which projects into a middle region of the ignition prechamber, is provided as a starting aid for the ignition prechamber.

11. An engine according to claim 9, wherein an igniting paper is provided as a starting aid for the ignition prechamber.

12. An engine according to claim 10, wherein an igniting paper is provided as a starting aid for the ignition prechamber.

13. An engine according to claim 1, wherein the ignition prechamber volume is 15 to 40% of the displacement volume.

14. An engine according to claim 2, wherein the ignition prechamber volume is 15 to 40% of the displacement volume.

15. An engine according to claim 1, wherein the temperature maintained in each ignition prechamber during the operation of the engine is set to exceed the temperature in the main combustion chamber by 150° to 200° C.

16. An engine according to claim 2, wherein the temperature maintained in each ignition prechamber during the operation of the engine is set to exceed the temperature in the main combustion chamber by 150° to 200° C.

* * * * *